United States Patent [19]

Uhrner et al.

[11] 4,277,734
[45] Jul. 7, 1981

[54] ELECTRIC BRAKE MOTOR

[75] Inventors: Rudolf Uhrner, Kuenzelsau; Klaus Teuke, Doerzbach; Wolfgang Schwarz, Uebrigshausen, all of Fed. Rep. of Germany

[73] Assignee: R. Stahl GmbH & Co., Fed. Rep. of Germany

[21] Appl. No.: 34,506

[22] Filed: Apr. 30, 1979

[30] Foreign Application Priority Data

May 6, 1978 [DE] Fed. Rep. of Germany ....... 2819942

[51] Int. Cl.³ .......................... H02P 1/26; H02P 3/18
[52] U.S. Cl. .................................... 318/758; 318/771
[58] Field of Search ............... 318/758, 771, 773, 777, 318/780

[56]  References Cited
U.S. PATENT DOCUMENTS

| 2,406,782 | 9/1946 | Lewis | 318/758 |
| 2,459,589 | 1/1949 | Schaelchlin et al. | 318/777 |
| 2,508,180 | 5/1950 | Mahnke et al. | 318/777 |
| 2,773,230 | 12/1956 | Emky | 318/771 |
| 3,090,899 | 5/1963 | Petit | 318/758 |

Primary Examiner—J. V. Truhe
Assistant Examiner—Richard M. Moose
Attorney, Agent, or Firm—Laubscher & Laubscher

[57]  ABSTRACT

An electric brake motor, particularly of the kind having a squirrel cage rotor and a slow-running stator winding with a large number of poles, is provided with electrical switching means to increase the motor current briefly on starting, at least on starting of the slowrunning winding, so as to increase the magnetic field generated by the motor current for releasing the brake. The switching means may be contacts actuated by axial movement of the rotor on starting, or a relay or contactor operated by the motor current or by a control switch. The increase in current may be achieved by briefly shortcircuiting part of the motor winding or by briefly connecting a second, fast-running stator winding in parallel with the slow-running winding in the case of a change-pole motor.

9 Claims, 8 Drawing Figures

ELECTRIC BRAKE MOTOR

BRIEF DESCRIPTION OF THE PRIOR ART

The invention relates to an electric brake motor, particularly for hoists of the kind having a squirrel-cage rotor, a stator winding with a large number of poles adapted to effect slow running of the motor, and a brake which can be released by a magnetic field generated by the motor current.

In known electric brake motors of this kind, the current which flows through the stator winding during the starting phase is insufficient to generate a magnetic field which will rapidly and reliably release the brake. To release the brake it is therefore necessary to provide additional means, for example, a separate brake magnet, thus resulting in increased construction costs. In electric motors in which a stator winding with a small number of poles for high speed operation is provided in addition to the stator winding with a large number of poles for slow running (French Pat. No. 11 28 071), it is known for the two windings to be connected in series while the motor is being started or when it operates at low speed, so that by thus increasing the number of ampere-turns the magnetic force for releasing the brake is increased. However, this results in an intermediate speed which is greater than the rotational speed actually corresponding to the stator winding having a large number of poles, and substantial heat losses must be tolerated. To increase the magnetic force required to release the brake when the motor is started, it is also known to use conical sliding rotors, for example as disclosed in the previously-mentioned French Patent Specification. However, in view of the accuracy required to maintain the air gap between the rotor and stator, production of such a motor is expensive. It is also costly to instal the windings in the conically constructed stator.

SUMMARY OF THE INVENTION

It is the object of the invention to increase the magnetic force for releasing the brake of a brake motor when switching on, and particularly during the starting phase of a winding with a large number of poles.

According to the invention, electric switching means are provided for briefly increasing the motor current during the starting phase. In a motor which has only a stator winding with a large number of poles, such winding is preferably provided with an electrical tapping by means of which part of the stator winding can be short-circuited during the starting phase. In a motor having a stator winding with a large number of poles for slow running and with a small number of poles for fast running, the stator winding with a large number of poles can be briefly connected in parallel with the stator winding having a smaller number of poles, which has an electrical resistance which is smaller than that of the winding with a large number of poles.

BRIEF DESCRIPTION OF THE DRAWING

Preferred embodiments of the invention will be described hereinbelow with reference to the accompanying drawings in which.

DETAILED DESCRIPTION

Figure 1:
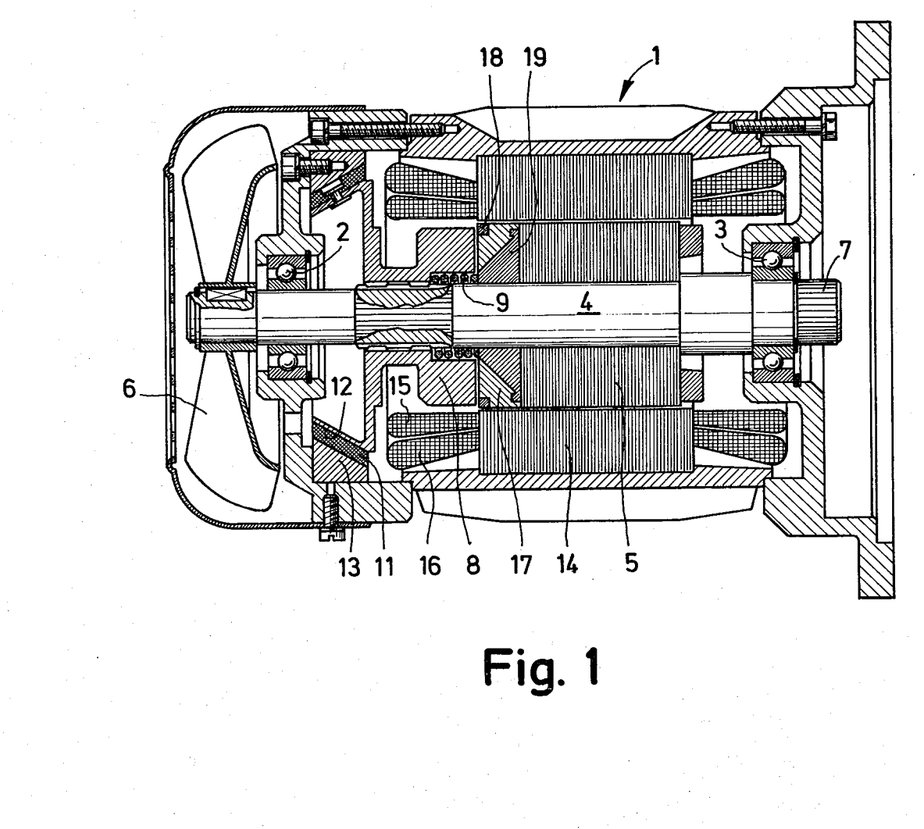
FIG. 1 is an axial section of a first electric brake motor embodiment in accordance with the present invention.

FIG. 1 shows a first embodiment of an electric brake motor to which the present invention is applicable. Only the most essential parts of the motor will be described hereinbelow, to the extent necessary for understanding the invention. The shaft 4 of a cylindrical squirrel cage rotor 5 is rotatably supported in bearings 2, 3 in a casing 1 comprising several parts. The end of the shaft 4 on the left in FIG. 1 supports a fan 6 for cooling the motor, and apparatus to be driven, for example a hoist, can be coupled to the opposite end 7 of the shaft 4. A sliding member 8 is but axially slidable on the shaft 4 and is keyed to the shaft so as to rotate therewith. The member 8 is biassed by means of a brake spring 9 away from the rotor 5 which is mounted on the shaft 4 in a manner preventing rotation and sliding. The sliding member 8 has a conical surface 12 which is provided with a brake lining 11. The brake spring 9, which is a compression spring, powerfully thrusts the brake lining against the inside of a brake cone 13 when the motor is switched off, so that the rotor 5 of the motor is braked.

The rotor 5 is surrounded by an extended stator 14, supporting two windings in conventional manner, namely an internal winding 15 with a large number of poles for slow running and an external winding 16 with a small number of poles for high-speed running of the motor. The rotor 5 is fixedly joined to a flux-reversing member 17 comprising iron segments, and rings 18 or 19 of aluminium and of the cross-sectional shapes shown in FIG. 1 are provided on the front and rear of the member 17. The member 17 diverts the magnetic field generated by the extended stator 14 so that when the motor is switched on, i.e. when current flows through the windings 15,16, the sliding armature 8 is pulled by the magnetic field against the action of the spring 9 towards the squirrel cage rotor 5 and releases the brake mounted on the armature 8 and formed by the brake lining 11. It has been found that the construction of the cylindrical rotor 5 with the flux-reversing member 17 substantially increases the magnetic force required for releasing the brake.

Figure 2:
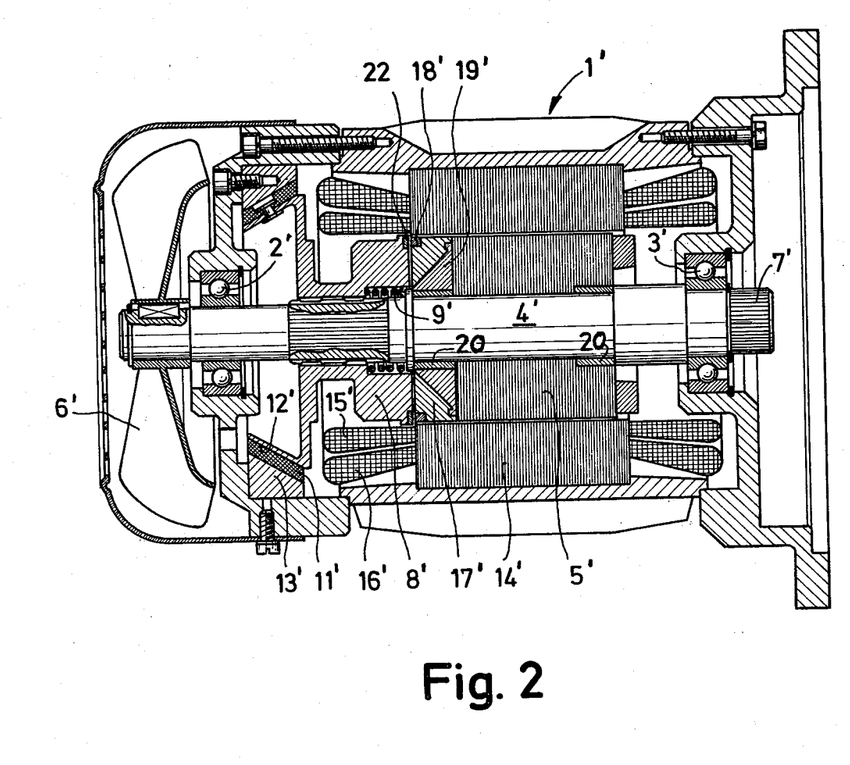
FIG. 2 is an axial section of a second electric brake motor embodiment.

Corresponding parts in the modified electric brake motor illustrated in FIG. 2 have primed reference numerals corresponding with the same reference numerals as those in FIG. 1. In contrast to FIG. 1, the squirrel cage rotor 5' in FIG. 2 is rotatable by means of bushes 20 on the shaft 4' but cannot slide axially. On the surface of the sliding armature 8' nearest to the flux-reversing member 17' is an annular clutch lining 22, so arranged that after the motor is switched on, i.e. when the sliding armature 8' has been pulled towards the rotor 5' by the prevailing magnetic field, the rotation of the rotor 5' is transmitted by the frictional engagement of the clutch lining 22 to the shaft 4' and therefore to apparatus which is to be connected at 7'. Such coupling between the rotor 5' and the armature 8' by frictional engagement, instead of by positive engagement offers the advantages that starting of the motor is smoother and, by appropriate choice of the frictional moment, overloading of the motor can be prevented, for example in the case of hoists, if a load of excessive weight is to be hoisted. The motor according to FIG. 2 is particularly advantageous as a traction (motor for example, for a crane).

Figure 3:
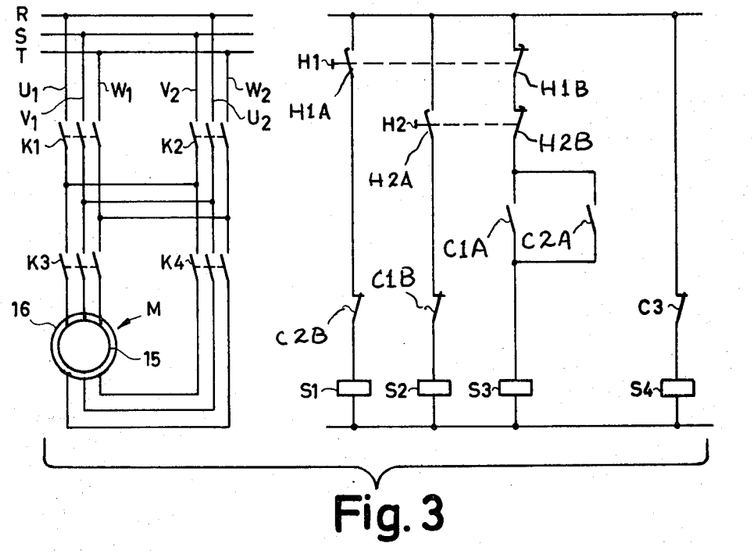
FIG. 3 is a circuit diagram for an electric brake motor according to the invention.

Normally, the slow-running winding 15 is switched on by itself for the starting of an electric brake motor according to FIG. 1 or FIG. 2 since this winding (of high resistance) results only in slow speed operation of the electric motor. However, this involves the disadvantage that owing to the low current, the magnetic field generated by the winding 15 is insufficient to attract the sliding armature 8 and therefore release the brake. The circuit illustrated in FIG. 3 can be used to avoid this disadvantage. In FIG. 3 the main supply lines which feed the electric brake motor M are shown on the left while the control current lines for controlling the motor are shown on the right. Conductors $U_1$, $V_1$, $W_1$ and $U_2$, $V_2$, $W_2$, branch off from the three-phase mains conductors R,S,T, and supply current to the slow-running winding 15 or to the fast-running winding 16 by way of contact sets K1, K2, K3 and K4 of respective contactors S1, S2, S3 or S4. The contactors also actuate contacts C1A(normally open), C1B(normally closed), C2A(normally open), C2B (normally closed) and C3 (normally closed). The control circuit shown in the right-hand part of FIG. 3 also contains two two-stage manual control switches H1 and H2 which have normally open contacts H1A and H2A, and normally closed contacts H1B and H2B. The circuit according to FIG. 3 functions in the following manner.

The control circuit in the right-hand part of FIG. 3 is assumed to carry current so that the contactor S4 is energized by way of the normally closed contact C3, and the contact set K4 is therefore closed. If the motor M is associated with a hoist, the switch H1 is for initiating the upward motion while the switch H2 is for the downward motion. Switching on an upward motion which is initially slow and subsequently fast, will be described as an example. To this end, the switch H1 is moved to its first-stage position, in which its contacts H1A and H1B are both closed, and the contactor S1 is thus energized via the contact H1A and the normally closed contact C2B: contact H2A is open so that contactor S2 is not energized. The contact set K1 is thus closed. The fast-running winding 16 is thus provided with current via the closed contact sets K1 and K4. Furthermore, by the energizing of the contactor S1, its contact C1A is closed so that the contactor S3 is energized via the contact of H1B the manual control switch H1 which is still closed, and the normally closed contact H2B of the switch H2. Accordingly, the contact set K3 is closed so that the winding 15 is also provided with current via the contact sets K1 and K3. Energization of contactor S3 however opens its contact C3 so that the contactor S4 is de-energized and the contact set K4 opens. As a result, the winding 16 is again de-energized. The motor M operates at slow speed by virtue of the winding 15, which alone still carries current. The contact C1B is opened, thereby locking out the contactor S2. If the manual control switch H1 is then set to its second stage position, in which its contact H1A remains closed while the contact H1B is opened, the contactor S3 will be de-energized and the contact C3 closes again so that the contactor S4 is again energized and the contact set K4 is closed. As the contactor S3 is de-energized the contact set K3 will also have opened, so that only the winding 16 is provided with current, and the motor rotates at high speed (upwardly).

Analogous conditions apply to switching on the downward movement. In this case, switch H2 is actuated to energize the contactor S2 and hence, via contact C2A, the contactor S3, and the contact set K2 is closed to supply power to the motor M.

Adopting this procedure ensures that the winding 16 briefly carries current whenever the slow running of the motor M is switched on (winding 15). The high current flow in the winding 16 results in the production of a powerful magnetic field by means of which the brake is immediately released. When the winding 16 is automatically de-energized after a short time in the manner already described, the relatively low current which flows through the winding 15 will be sufficient for generating a magnetic field that will maintain the sliding armature 18 in contact with the rotor 5 and therefore hold the brake off. During the starting phase of the motor the two windings 15 and 16 are connected in parallel with each other until the contactor S3 reacts. The starting time of the winding 16 will depend on the intrinsic operating time of the contactor S3. It has been found that switching of the winding 16 for a period of approximately 1/50 second is sufficient to release the brake reliably.

Figure 4:
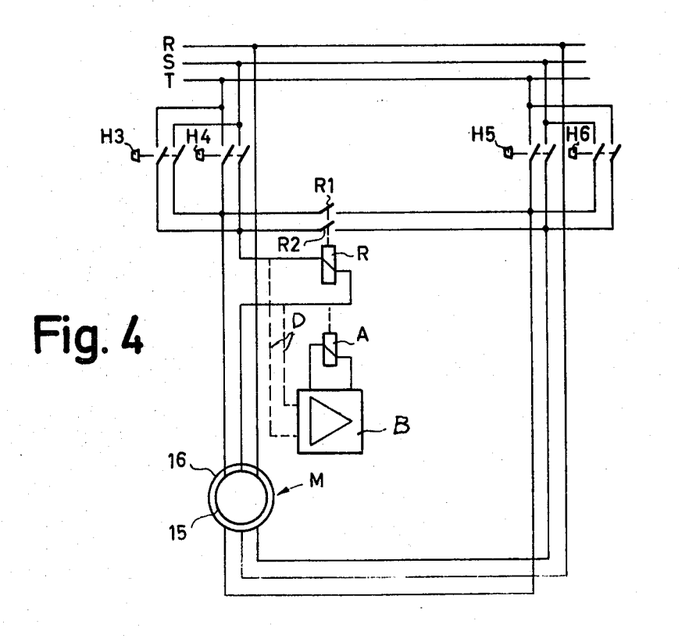
FIG. 4 is a circuit diagram of another motor control system according to the present invention.

In contrast to FIG. 3, a separate control circuit is not provided in the circuit diagram according to FIG. 4; instead, manual control switches H3, H4, H5, H6 are connected into the main circuit of the motor M. The switch H3 is associated with a slow upward motion, the switch H4 with a slow downward motion, the switch H5 with a fast upward motion and the switch H6 with a fast downward motion of a hoist coupled to the motor M. To generate a powerful magnetic field for releasing the brake when the slow motion of the motor M is switched on, the starting current surge due to closing of the switch H3 or H4 briefly energizes a surge relay R so that the contacts R1 and R2 of the relay R temporarily close. As a result the winding 16 is briefly energized by way of these contacts, in addition to the stator winding 15. The powerful magnetic field thus temporarily generated releases the brake. After the starting current surge has decayed, the relay R drops out, the contacts R1, R2 open and only the winding 15 continues to carry current, so that the motor M operates at its slow speed. Operation of the switch H5 or H6 directly switches on the fast upward motion or fast downward motion. It has been found that the starting current surge which energizes the relay R has a duration of, for example, 0.2 seconds. This is sufficient for reliably releasing the brake.

The current surge relay R in FIG. 4 can be replaced by another relay A which actuates the contacts R1 and R2 and is controlled by an electronic circuit B with an adjustable time constant. The circuit B is connected to the main motor circuit via the two conductors D shown in broken lines in FIG. 4 and is set into operation when the switch H3 or H4 is closed. The method of operation is as already described in connection with the current surge relay R.

Figures 5, 6:
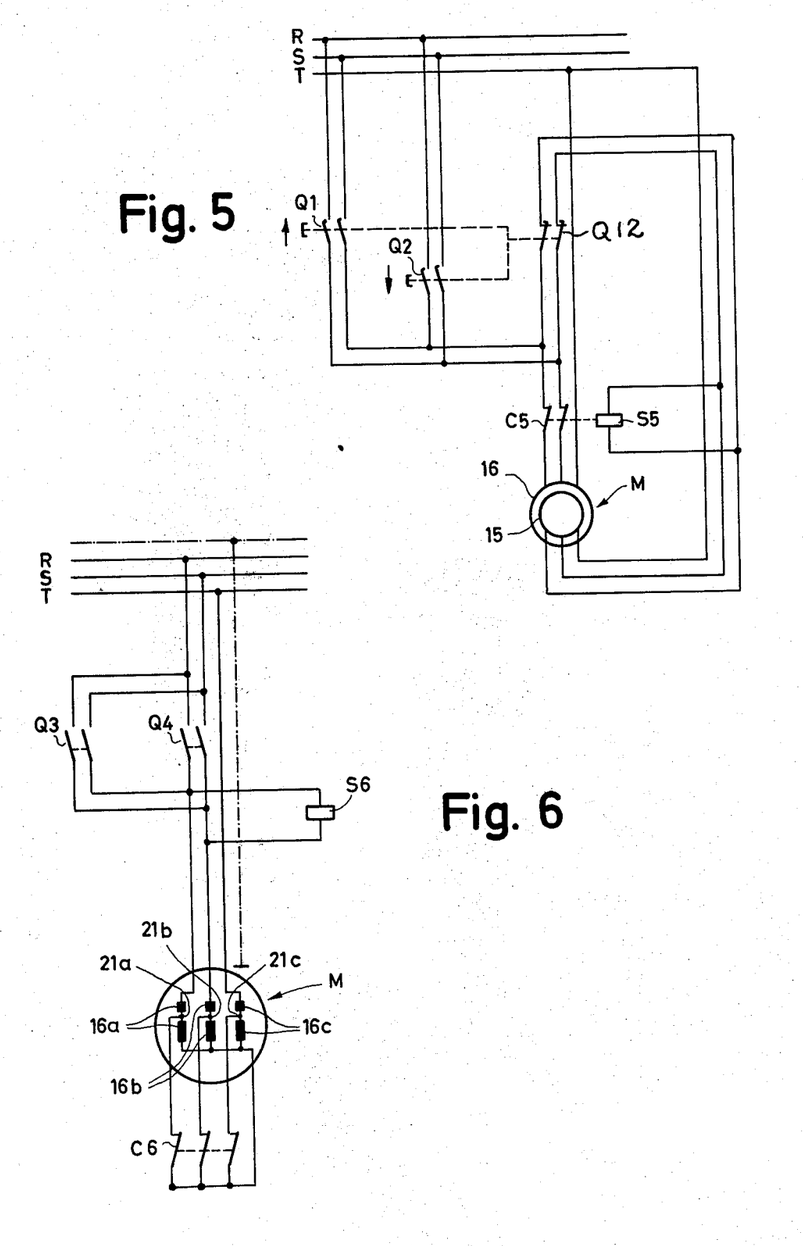
FIG. 5 is a circuit diagram of a further motor control system according to the present invention.
FIG. 6 is a circuit diagram of an electric brake motor having a stator winding designed for only a large number of poles.

The circuit shown in FIG. 5 has two two-stage, manually actuated control switches Q1, Q2 connected into the main motor circuit, for motion in opposite directions respectively. In the state shown in FIG. 5 the switches Q1, Q2 are open, but a contact set Q12 operable by both switches is closed. If one of the switches is set to the first-stage position both windings 15,16 of the motor M will be energized by way of contact set Q12 and a contact set C5 of a contactor S5. The contactor S5 is energized via the contact set Q12, so that the contacts C5 of the contactor open. Accordingly, after a brief starting time, the winding 16 is again de-energized. The on-time of the winding 16 will depend on the reaction time of the contactor S5, i.e. both windings carry current simultaneously until the reaction time of the contactor S5 has elapsed. Due to the winding 16 being briefly switched on, a powerful magnetic field will prevail for a short time and is sufficient to reliably release the brake. If the switch Q1 or Q2 is pushed through completely, i.e. if it is set to its second-stage position, current flow to the winding 15 will be interrupted by opening of the contact set Q12, and the contact S5 will be de-energized so that the contacts C5 again close. Only the winding 16 will then be energized, i.e. the motor M operates at its fast speed.

FIG. 6 shows the circuit diagram of a slow running brake motor, for example of the kind used for the traversing motion of a crane or the like. A motor of this kind contains only a stator winding with a large number of poles. In all other respects the motor can be constructed as indicated in FIGS. 1 and 2. The stator winding is indicated in FIG. 6 by winding blocks 16a, 16b and 16c each of which is associated with one phase of a three-phase system. Each winding has an assymetrical electrical tapping 21a, 21b or 21c. The tapping ratio related to the number of windings can be 1:3 to 1:4. Two single-stage manual control switches Q3, Q4, for traversing motion in opposite directions respectively, are disposed in the main circuit of the motor.

If one of the two manual control switches Q3 or Q4 is actuated, only the smaller parts of the stator windings will be energized, because the larger parts of the windings will be short circuited by normally closed contacts C6 of a contactor S6. Closing of the manual switch Q3 or Q4 also causes the contactor coil S6 to be energized, so that the contacts C6 are opened with a slight delay. This delay is sufficient for the correspondingly increased current which flows in the smaller stator winding parts that are not initially short-circuited to produce a magnetic force sufficiently large to release the brake. The magnetic force which remains when the whole stator winding is energized after opening of the contacts C6 is sufficient to retain the brake in the released state. The motor will then operate with the normal operating current, each of the two winding groups being connected in series. The circuit according to FIG. 6 can be readily modified in such a way that control is effected by contactors connected in a separate control circuit similar to FIG. 3, instead of by switches Q3, Q4 which are connected in the main circuit. The circuit can also be designed with a current surge relay similar to that of FIG. 4. Furthermore, the windings 16a, 16b, 16c could also be divided into two halves which are connected parallel with each other at the moment of starting and are subsequently connected in series. Brief boosting of the magnetic field and therefore of the pulling-off force of the brake can also be achieved by converting the star-delta circuit, normally used for starting motors, into a delta-star circuit so that on being switched on the stator windings receive a voltage which is $\sqrt{3}$ times higher than the nominal voltage, and the pulling-off force of the brake will increase correspondingly.

Figure 7:
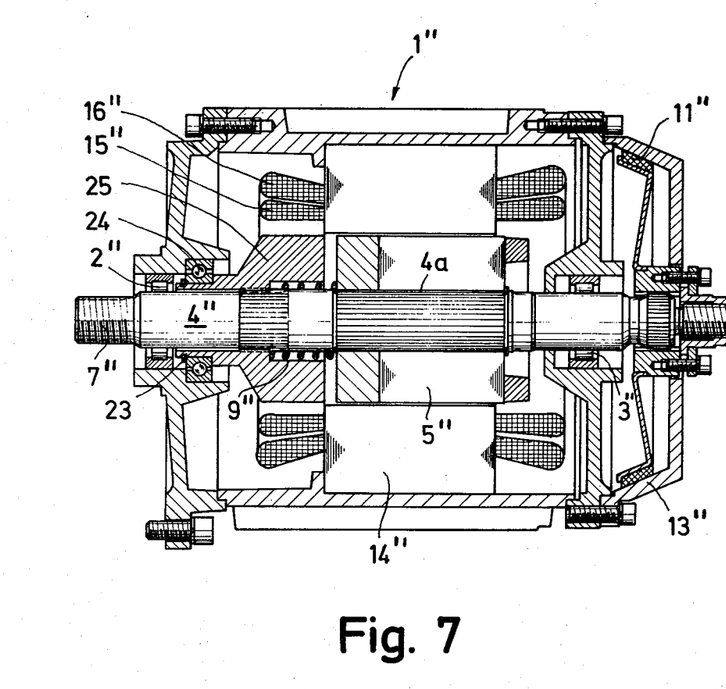
FIG. 7 is an axial section of a third electric brake motor embodiment.
Figure 8:
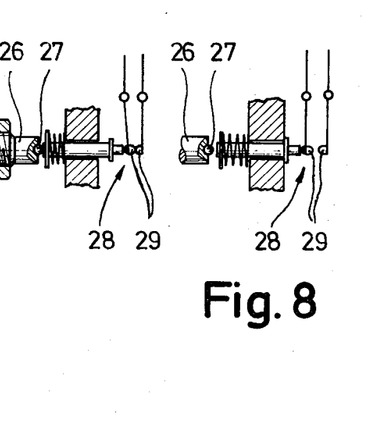
FIG. 8 shows a portion of the motor of FIG. 7, showing another operating condition of the motor.

The principle of the invention is to briefly increase the motor current during the starting phase by electric switching means. In the exemplifying embodiments described above this is achieved by means of a contactor or relay control system so that the high current which flows briefly is always again switched off. FIGS. 7 and 8 show means by which the high current which flows for a short period can be switched off by an axial shifting motion of the motor shaft, i.e. by purely mechanical means. To this end, it is advantageous to employ a motor according to FIG. 7 in which an armature 25 is rotatably supported in a bearing 24 but is prevented by a circlip 23 from sliding axially. The armature 25 is coupled to the shaft 4" by splining. The squirrel-cage rotor 5" is coupled to the shaft 4" by splining 4a, and relative sliding of the shaft and rotor is prevented. Consequently the shaft and rotor can slide but the shaft, rotor and armature will rotate together. When the motor is switched off a compression spring 9" thrusts the squirrel cage rotor 5" and together therewith the shaft 4" to the right in FIG. 7 so that a brake, formed by the brake lining 11" which rotates with the shaft 4", is engaged. A hardened ball 27, by means of which a switch 28 with contacts 29 can be actuated by the sliding motion of the shaft 4", is placed in the centre of the end 26 of the shaft 4" which projects from the motor casing 1" and is situated on the right in FIG. 7. When the motor is switched on, the squirrel cage rotor 5" is pulled to the left, towards the armature 25, against the action of the spring 9" under the influence of the prevailing magnetic field, so that the brake is released and the contacts 29 open (see FIG. 8). The switch 28 can be a multipole main switch adapted to switch off the fast-running winding 16" in the case of a change-pole motor, the winding 16" at the moment of switching on being connected in parallel with the slow-running winding 15". However, in a circuit similar to FIG. 6 the switch 28 can perform the function of the contactor S6. The switch 28 can also be a control current switch which acts on an associated contactor.

The invention can be applied with particular advantage to electric brake motors with cylindrical squirrel cage rotors according to FIGS. 1, 2 and 7. In principle, however, the invention can also be applied to other brake motors, for example those in which the air gap between the squirrel cage rotor and the brake armature can be conical without it being necessary for the stator laminations having to be made conical. Given a conical air gap it would be possible to obtain a more advantageous characteristic of the magnetic force and frictional engagement in dependence on the sliding travel of the brake armature. The invention is applicable to asynchronous electric brake motors of every kind, more particularly brake motors of the kind employed for the hoisting and/or travelling gear of hoists, having provided therein a squirrel cage rotor and a brake which can be energized by the motor current. The principle of the invention is that steps are taken at any suitable time to briefly increase the energy required for energizing the brake. Generally this relates to motors with a winding having a large number of poles and resulting in slow speed, see also the embodiments described above. The switching facilities set forth hereinabove in accordance with the invention can also be applied in limiting cases to two-pole motors. As already described and illustrated the circuit means according to the invention can be assisted by winding facilities. This can be achieved by tapping the windings so that the windings inductances are reduced to the necessary degree during the starting phase so that as a result the magnetic flux in the motor and in the magnetically energized part of the brake is increased. A second winding with a different number of poles can be switched on during the starting phase and together with the brake part can generate the higher forces required for releasing the brake. In general the second winding will have the lower number of poles. Fundamentally it is however also feasible to obtain even greater sliding forces with windings having a large number of poles. Windings with a different number of pole pairs can be selected for the starting phase, more particularly in change-pole machines, so that the neutral configuration of the windings induces no voltages and two rotating fields are produced of which one applies a higher force in order to release the brake. In this case the motor will operate at superssynchronous speed as regards the winding with a large number of poles and by virtue of its generator action will maintain the equilibrium with respect to the motor action of the part with the small number of poles.

I claim:

1. An electric brake motor having a casing, said motor comprising
   (a) a stator winding supported within the motor casing;
   (b) a rotor mounted for rotation relative to said stator winding;
   (c) means supplying driving current to said motor;
   (d) normally-activated brake means connected with the motor casing, said brake means being operable to a brake-released condition when the motor current reaches a given value; and
   (e) means including electric switch means for briefly increasing said motor current to said given value during starting of the motor.

2. An electric brake motor having a casing, said motor comprising
   (a) a first stator winding supported within the motor casing, said first stator winding having a relatively large number of poles for effecting a slow motor running condition;
   (b) a squirrel cage rotor mounted for rotation relative to said first stator winding;
   (c) means supplying driving current to said stator winding;
   (d) normally-activated brake means connected with the motor casing, said brake means being operable to a brake-released condition by the magnetic field produced when the motor current equals a given value; and
   (d) means including electric switch means for briefly increasing the motor current to said given value during starting of the motor.

3. A motor according to claim 2, in which the first stator winding includes an electrical tapping so connected that part of the stator winding can be short circuited by the said switching means.

4. A motor according to claim 2, and further including a second stator winding with a relatively small number of poles and having a lower electrical resistance, said switching means being arranged to connect said second stator winding briefly, on starting, in parallel with said first stator winding.

5. A motor according to claim 2, wherein parts of said first winding are connected in parallel during the starting phase, said winding parts being connected in series during the running phase.

6. A motor according to claim 2, wherein said first stator winding is delta-connected for the starting pase and star-connected for the running phase.

7. An electric brake motor having a casing, said motor comprising
   (a) a first stator winding supported within the motor casing and having a relatively large number of poles for effecting a slow motor running condition;
   (b) a second stator winding supported with the casing and having a relatively small number of poles and a lower electrical resistance;
   (c) a squirrel cage rotor mounted for rotation relative to said first and second stator windings;
   (d) means supplying driving current to at least one of said stator windings;
   (e) normally-activated brake means connected with the motor casing, said brake means being being operable to a brake-released condition by the magnetic field produced when the motor current equals a given value; and
   (f) means including electric switch means for briefly increasing the motor current to said given value during starting of the motor, said switch means including at least one contactor for connecting said second stator winding briefly in parallel with said first stator winding.

8. An electric brake motor having a casing, said motor comprising
   (a) a first stator winding supported within the motor casing and having a relatively large number of poles for effecting a slow motor running condition;
   (b) a second stator winding supported with the casing and having a relatively small number of poles and a lower electrical resistance;
   (c) a squirrel cage rotor mounted for rotation relative to said first and second stator windings;
   (d) means supplying driving current to at least one of said stator windings;
   (e) normally-activated brake means connected with the motor casing, said brake means being operable to a brake-released condition by the magnetic field produced when the motor current equals a given value; and
   (f) means for briefly increasing the motor current to said given value during starting of the motor, said current increasing means including relay means responsive to the starting current surge of said first stator winding for connecting said second stator winding briefly in parallel with said first stator winding.

9. An electric brake motor having a casing, said motor comprising
   (a) a first stator winding supported within the motor casing and having a relatively large number of poles for effecting a slow motor running condition;
   (b) a second stator winding supported with the casing and having a relatively small number of poles and a lower electrical resistance;
   (c) a squirrel cage rotor mounted for rotation relative to said first and second stator winding, said rotor being axially displaceable relative to said casing;
   (d) means supplying driving current to at least one of said stator windings;

(e) normally-activated brake means connected with the motor casing, said brake means being operable to a brake-released condition by the magnetic field produced when the motor current equals a given value; and
(f) means for briefly increasing the motor current to said given value during starting of the motor, said current increasing means including at least one switch arranged for actuation by said axially movable rotor.

* * * * *